United States Patent Office 3,480,588
Patented Nov. 25, 1969

3,480,588
STABLE COATING COMPOSITION OF A TRI-CARBOXYLIC ACID OR ITS PARTIAL OR FULL ESTER AND A DIAMINE
Edward Lavin, Longmeadow, Albert H. Markhart, Wilbraham, and James O. Santer, Springfield, Mass., assignors to Monsanto Company, St. Louis, Mo., a corporation of Delaware
No Drawing. Continuation-in-part of application Ser. No. 303,395, Aug. 20, 1963. This application Jan. 2, 1968, Ser. No. 694,860
Int. Cl. C08g 20/20
U.S. Cl. 260—47                    12 Claims

ABSTRACT OF THE DISCLOSURE

Disclosed herein are novel coating compositions comprising an aromatic tricarboxylic component and a polyamine containing at least two primary groups per molecule wherein the aromatic tricarboxylic component is selected from the group consisting of free tricarboxylic acids and partial and full ester derivatives of tricarboxylic acids.

CROSS-REFERENCES TO RELATED APPLICATIONS

This application is a continuation-in-part of our copending application U.S. patent application Ser. No. 303.395, filed Aug. 20, 1963, and now abandoned.

BACKGROUND OF THE INVENTION

Field of the invention

The present invention relates to coating compositions prepared from (1) an aromatic tricarboxylic component and (2) a diamine containing at least two primary amino groups per molecule wherein the aromatic tricarboxylic component is selected from the group consisting of free tricarboxylic acids and partial and full ester derivatives of tricarboxylic acids.

Description of the prior art

The prior art in U.S. 3,260,691 shows the reaction between (1) tricarboxylic anhydrides and their acid halide derivatives and (2) a diamine in order to prepare soluble polyamides. These soluble polyamides may then be heat cured to form insoluble, infusible polymers. The prior art does not show stable monomeric type solutions of (1) tricarboxylic acids and/or their ester derivatives and (2) a polyamine containing at least two primary amino groups per molecule. These latter solutions are especially valuable as coating compositions which may be applied to a substrate and polymerized in situ to form tough, adherent, heat resistant and dielectrical materials.

The present invention fulfills the above mentioned need in the prior art by providing stable monomeric type solutions of (1) tricarboxylic acids and/or their ester derivatives and (2) a polyamine containing at least two primary amino groups per molecule.

SUMMARY OF THE INVENTION

This invention relates to coating compositions which can be heat cured to tough, adherent, heat resistant and dielectric materials; more particularly, it relates to certain insulative varnishes obtained from certain particular tricarboxylic compounds and certain particular polyamino compounds that may be condensed in situ to resins of excellent insulative and binding power.

The employment of synthetic resins for electrical insulation is not new. In fact, many have found wide commercial acceptance in such applications as, for instance, magnet wire coating. In that process, wire of an appropriate gauge is first successively covered by means of a specialized technique with multiple layers of one or more enamels. The covered wire is then wound into coils for incorporation into motors, generators and the like. Prior to final assembly however, the stator and rotor coils are usually dipped into special varnishes which when baked will form a firmly binding envelope and will, in addition, often contribute to the total insulation of the systems.

For the convenience of the trade and in reference to the operating temperatures to which the enameled and varnished wire coils are ultimately destined, a classification has been developed and applied to such enamels and varnishes (American Institute of Electrical Engineers, Insulation classification No. 1, June 1957). These classes range from 90° C. to 220° C. A class 220° C. enamel for instance, will be employed in equipment designed for use at temperatures of 220° C. or higher. It is with varnishes for enamels of this class that the present invention is primarily concerned.

The introduction of synthetic organic resins in enamels of this 220° C. class is a rather recent development in the art. Nevertheless, because of an excellent balance of properties as compared to the inorganic materials constituting the bulk of the class, the new materials are already used extensively. With this development, however, has arisen the need for new monomeric type varnishes capable of performing satisfactorily under the rigorous thermal conditions attending the employment of such polymers.

It is therefore an object of this invention to provide an impregnating varnish suitable for use on 220° C. rated magnet wire, capable of developing adequate bond strength at elevated temperature while being at the same time compatible with the magnet wire film insulation.

It is another object of this invention to provide novel coating compositions for coating various substrates and a process for preparing the same.

DESCRIPTION OF THE PREFERRED EMBODIMENTS

The foregoing objects have been accomplished by the formulation of solutions of certain organic monomers that can be applied to wires, coils, fibrous reinforcing elements, metal surfaces, or other substrates and condensed in situ to highly polymerized and crosslinked structures having the excellent binding and insulative properties that coil varnishes must possess.

The tricarboxylic monomeric reactants used in the present invention are represented by the following general formula:

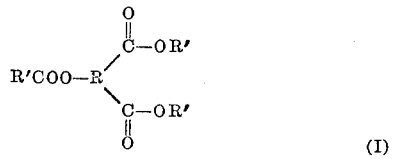

(I)

wherein R is a trivalent aromatic radical containing from 6 to about 15 carbon atoms selected from the group consisting of aromatic carboxylic radicals, aromatic heterocyclic radicals, combinations of aromatic and aliphatic radicals and cycloaliphatic radicals. However, the preferred trivalent radicals are aromatic radicals in which the R groups have at least one ring of 6 carbon atoms characterized by benzenoid unsaturation (alternate double bonds in a ring structure), and particularly those aromatic trivalent radicals wherein the three carboxylic groups are each attached to separate carbon atoms in a benzene ring and wherein one pair of carboxylic groups are located in a 1,2 or 1,3 position in respect to each other. R' in the foregoing Formula I is selected from the group consisting of hydrogen, alkyl radicals of from 1 to 8 carbon atoms, oxyalkyl radicals of from 2 to 8 carbon atoms, hydroxyalkyls and hydroxy(oxy)alkyl radicals wherein the alkyl radical contains from 2 to 12 carbon atoms; aryl radicals of from 6 to 10 carbon atoms; and N,N dialkyl alkyl radicals of the following general formula:

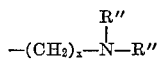

wherein R″ is an alkyl radical of from 1 to 5 carbon atoms and $x$ is an integer of from 2 to 6.

Examples of suitable tricarboxylic acid compounds include trimellitic acid; 1,3,8-tricarboxynaphthalene, benzophenone-3,3′,4′ tricarboxylic acid, benzophenone-4,3′,4′-tricarboxylic acid, tricarboxybiphenyl, tricarboxydiphenyl ether, tricarboxydiphenyl sulfone, tricarboxydiphenyl sulfide, tricarboxydiphenyl phosphonyl. Preferred tricarboxylic compounds are the isomers of trimellitic acid and benzophenone tricarboxylic acid.

The free tricarboxylic acids used may be prepared by reacting the corresponding dianhydrides with water or by other methods well known to those skilled in the art.

The ester derivatives of the foregoing tricarboxylic components represented in Formula I are readily prepared by reacting the corresponding dianhydride with a hydroxylic compound such as ethanol. By controlling the reaction conditions one may prepare partial or full ester derivatives of the type described above in reference to Formula I. Examples of other suitable alcohols in addition to ethanol mentioned above include methanol, propanol, butanol, pentanol, hexanol, heptanol, octanol, methylene glycol, ethylene glycol, diethylene glycol, triethylene glycol, 3-propane diol; 1,4-propane, propylene glycol, diol; 2-(dimethylamino)ethanol, 3 - (dimethylamino)propanol; 3-(N-ethyl-N-methyl amino)propanol, phenols, etc. The preferred esters are those wherein R′ is an alkyl of from 1 to 8 and more preferably from 1 to 4 carbon atoms.

The tricarboxylic acid esters used in the practice of this invention are available commercially or can be readily prepared by one skilled in the art according to the procedures set forth below, or in standard reference texts such as Heilbron and Bunbry, "Dictionary of Organic Compounds." Eyre and Spottiswood, London (1953), as well as other references which are well known to those skilled in the art.

The polyamine monomeric components used in the present invention are represented by the following general formula:

$$R_1(NH_2)_n \qquad (III)$$

wherein $R_1$ is an n-valent aromatic radical of from 6 to 52 carbon atoms.

The polyamines used in the practice of the present invention include diamines characterized by the formula: $R_1(NH_2)_2$ wherein $R_1$ is a divalent radical containing at least six carbon atoms selected from the following groups: aromatic, cycloaliphatic, combination of aromatic and aliphatic, heterocyclic and bridged aromatic radicals wherein the bridging group is a divalent radical selected from the group consisting of alkylene of from 1 to 6 carbon atoms, oxygen, arylene of from 6 to 16 carbon atoms, —NH—, sulfur, sulfonyl, carbonyl, phosphorous, phosphonyl, silyl and derivatives thereof. The preferred $R_1$ groups in the diamines are the aromatic amines containing at least one ring of 6 carbon atoms, characterized by benzenoid unsaturation. Such $R_1$ groups include paraphenylene, meta-phenylene, bisphenyl radicals, fused ring systems having 2 to 4 aromatic nuclei, wherein the two amine groups would be located on separate aromatic nuclei and bridged organic radicals of the general formula:

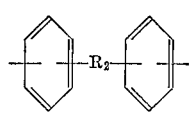

(IV)

wherein $R_2$ is a divalent radical selected from the group consisting of an alkene radical of from 1 to 6 carbon atoms, arylene radicals of from 6 to 16 carbon atoms, oxygen, —NH—, carbonyl, sulfonyl, phosphonyl and silyl radicals wherein the substituent groups on the silyl radicals are aryl groups and those structures wherein the $R_2$ group is a divalent linking moiety joining the aromatic nuclei by ester, amide and thioester linkages.

Among the diamines which are suitable for use in the present invention are: meta-phenylene diamine; para-phenylene diamine; 4,4′-diamino-diphenyl propane; 4,4′-diphenyl methane; benzidine; 4,4′-diamino-diphenyl sulfides; 4,4′-diamino-diphenyl sulfone; 3,3′-diamino-diphenyl sulfone; 4,4′-diamino-diphenyl ether; 2,6-diaminopyridine; bis-(4-amino-phenyl)diethyl silane; bis-(4-amino-phenyl)diphenyl silane; bis-(4-amino-phenyl)-N-methyl amine; 1,5-diamino naphthalene; 3,3′-dimethyl-4,4′-diamino-diphenyl; 3,3′-dimethoxy benzidine; 2,4-bis(beta-amino-t-butyl)toluene; bis-(para-beta-amino-t-butyl-phenyl) ether; para-bis(2-methyl-4-amino-pentyl)benzene; para-bis-(1,1-dimethyl-5-amino-pentyl)benzene; m-xylylene diamine; p-xylylene diamine; bis(para-amino-cyclohexyl-)methane; hexamethylene diamine; heptamethylene diamine; octamethylene diamine; nonamethylene diamine; decamethylene diamine; 3-methyl-heptamethylene diamine; 4,4-dimethylheptamethylene diamine; 2,11-diamino-dodecane; 1,2-bis-(3-amino-propoxy) ethane; 2,2-dimethyl propylene diamine; 3-methoxy-hexamethylene diamine; 2,5-dimethyl-hexamethylene diamine; 2,5-dimethyl-heptamethylene diamine; 5-methylnonamethylene diamine; 1,4-diamino-cyclohexane, 1,12-diamino-octadecane; 2,5-diamino-1,3,4-oxadiazole; $H_2N(CH_2)_2O(CH_2)_3NH_2$; $H_2N(CH_2)_3NH_2$; $H_2N(CH_2)_3N(CH_3)$; $(CH_2)_3NH_2$; 3,3′-dichlorobenzidine; bis-(4-amino-phenyl)ethyl phosphine oxide; bis-(4-amino-phenyl)-phenyl phosphine oxide; bis-(4-aminophenyl(N-phenylamine; p-phenylene-bis-2(amino-1,3-benzoxazole; 2,5-bis(p-amino phenyl)-1,3,4-oxadiazole; m-phenylene-bis-(m-aminobenzamide); 3,4′-diamino benzanilide and mixtures of the foregoing. Other useful amino compounds are 4,4′-thioaniline diphenyl ether, 4,4′-diaminotriphenylamine, 1,2-triaminobenzene, polymethylene polyaniline made by the reaction of aniline with formaldehyde:

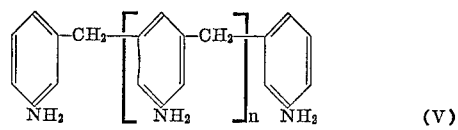

(V)

where $(n)$ can vary from 0 to 3; the reaction products of diacyl halides with excess diamines:

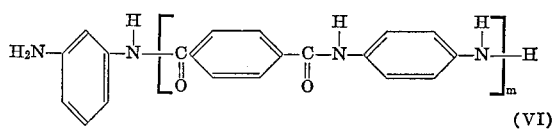

(VI)

where $m$ can be 1 to 4. Mixtures of these amines may be employed.

The polyamines illustrated in Formula V are prepared by the reaction of aniline and formaldehyde as is well known to those skilled in the art.

The general procedure for preparing these compounds is to react at least two (2) moles of aniline with one (1) mole of formaldehyde in the presence of an equivalent amount of concentrated hydrochloric acid. The aniline and hydrochloric acid are charged to a reaction vessel and formaldehyde (50%) is added at temperatures in the range of 50–90° C. The reactants are refluxed for about one hour at about 100° C., after which time the batch is cooled to at least 40° C. Equivalent amounts of sodium hydroxide are added to the batch. The layer containing the condensation product of the aniline and formaldehyde is then washed and steam distilled to remove any unreacted aniline.

Additional procedures for preparing these components may be found in U.S. Patents 2,974,168 and 2,818,433.

The compounds represented by Formula VI are prepared by methods generally well known to those skilled in the art. In one method, these compounds are prepared by reaction of an aromatic diacyl halide with excess amount of an aromatic diamine. For example, reaction of iso- or tere-phthaloyl chloride with an excess of diamines such as m- or p-phenylene diamine, methylenedianiline, etc., as is illustrated below:

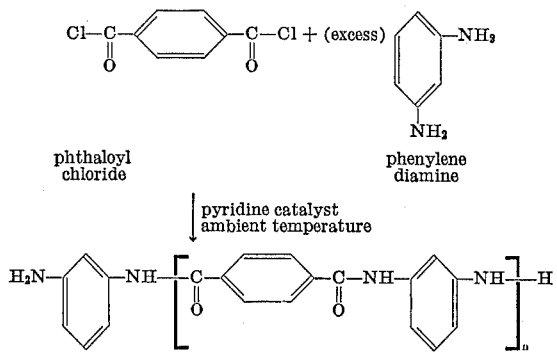

Another method involves the reaction of one mole of an aromatic diacyl halide with two moles of a monofunctional aromatic amine carrying a nitro-substituent, and subsequent reduction of the nitro groups, as is illustrated below:

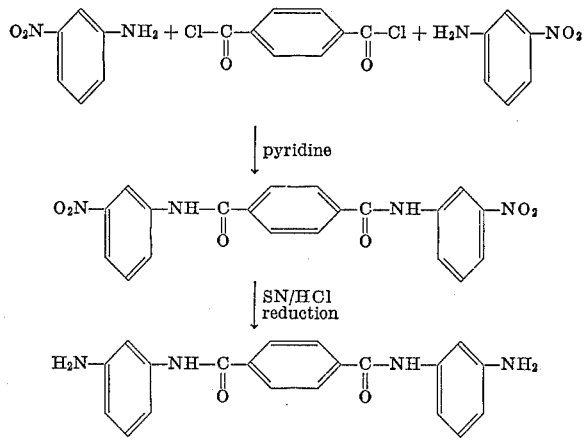

From the foregoing descriptions, those skilled in the art will readily recognize the methods and procedures used to prepare those compounds represented by Formulae V and VI above.

The proportions of monomers can vary, on a molar basis, from about 25% excess of the tricarboxylic compound to about a 100% excess of the diamine. Preferred however, are chemically equivalent amounts of both types of monomers to a molar excess of the amine monomer of up to 50%.

Useful solvents with which to prepare the solutions disclosed include organic liquids such as the lower alkyl alcohols of from 1 to 8 carbon atoms such as methanol, ethanol, propanol, butanol, pentanol, hexanol, ethylene glycol, propylene glycol, N,N-diethyl propanol, acetone, methyl ethyl ketone, dioxane, cresol, toluol, N-methyl pyrrolidone, dimethylacetamide, dimethyl formamide, high boiling petroleum hydrocarbons and mixtures thereof. Mixtures of water with certain organic liquids such as acetone and alcohol may be employed where the solubility of the monomer permits.

The solids content of the solutions is preferably at least 3% by weight. Most applications are more economically carried out with solutions containing from 3 to 75% and more preferably 15 to 60% solids. In the case of electrical varnishes, solids contents of 20 to 60% have been found most satisfactory. The exact concentration employed ultimately hinges on the thickness of coat desired. In general, it should be noted that a greater range of usable solids concentration is available with monomer solutions than with polymer solutions since in such cases the usual viscosity restrictions imposed by the use of polymers are minized. Intimate mixtures of dry solid monomers may also be used for certain operations such as fluid bed coatings, molding powders, etc.

The temperatures to which the components are subjected during the preparation of the monomeric solutions should not exceed 100° C. In fact said solutions should preferably not be allowed to remain at temperatures higher than about 60° C. for more than a few minutes. It should be realized of course that the term "monomeric solution" refers only to the fact that the monomers therein are not yet condensed to a polymer and are still available for such a reaction. The free carboxyl groups of one monomeric reactant may possibly form a salt with the amino groups of the other monomeric reactant thus generating the heat noted in the mixing process.

The following examples are set forth to illustrate the present invention and should not be construed as limitations thereof. All parts and percentages given are by weight unless otherwise indicated.

EXAMPLE 1

The monoethyl ester of trimellitic acid is prepared as follows: trimellitic anhydride (96.0 g., 0.5 mol) is placed in a jar and slurried with N-methylpyrrolidone (268 g.). Ethanol (24 g. anhydrous 2B) is added and the slurry is warmed with stirring until all the trimellitic anhydride (TMA) is dissolved. The solution is maintained at 50 to 60° C. for 30 minutes to ensure complete reaction of the anhydride to form the mixed 1- and 2-ethyl esters of trimellitic acid.

Xylene (134 g.) and methylene dianiline (148.5 g.) are then added to the solution of mixed monoethyl esters of trimellitic acid and the solution is warmed to 65° C. until all the solids dissolve. The resulting stable solution containing 40% by weight of dissolved solids is then used to varnish coils of enameled magnet wire such as those forming the windings of the electrodynamic machines. The bond strength of the baked varnish envelope is then determined. The varnishing procedure and bond strength determination methods can be summarized as follows:

Vanishing wire coils.—The method used in an adaption of that published by John Dexter in "Insulation," September 1955, page 12.

The enameled wire samples are heat annealed for one hour at 200° C. The annealed wire is then closely wound on a ¼ inch diameter mandrel and cut into 3¾ inch long sections. These sections are dipped in the varnish and dried two hours at 100° C. and two hours at 175° C. Another reverse dip follows with the same drying cycle. A film build increase of 1 to 2 mils is accomplished in this manner. The varnished coils are finally cured for four hours at 225° C.

Bond strength determination.—In this test, the varnished lengths of coil are laid flat on two fixed supports which are approximately two inches apart and a measured force is applied downwards on the coil until the coil breaks. Since the unvarnished coil's resistance to this treatment is negligible, the force needed to break the coils is essentially a measure of the flexural breaking strength of the cured varnish envelope. The test procedure is carried out with an Instron tester. A minimum flexural breaking strength of 5 lbs./mil of varnish thickness is considered acceptable for the purposes of this invention.

Bond strength is determined at room temperature and at higher temperatures. In the latter cases, the length of coil is heated by electrical current, the temperature being measured by a thermocouple pyrometer system. Once the desired temperature is reached, the bond strength is determined.

The following bond strength is thus observed for the varnish of this example: (The results are compared with the strengths obtained for a commercial high temperature silicone varnish applied to identical magnet wire coils).

BOND STRENGTH OF VARNISHED COILS, POUND BREAKING STRENGTH

| Temperature | Varnish | |
|---|---|---|
| | Example 1, lbs. | Silicone, lbs. |
| Room temperature | 41.2 | 30 |
| At 180° C | 29.5 | 1 |
| At 225° C | 10.2 | 0 |

The superiority of the varnish of this invention is evident.

The ester derivatives formed in Example 1 is a mixture of the 1- and 2-ethyl esters of trimellitic acid; this is evident from the manner in which the reaction is carried out. Other ester derivatives containing more than one ester group can be employed as well; for example, the 1,2,4-triester derivative is readily prepared and has been found to form satisfactory coating solutions.

EXAMPLE 2

The following example is set forth to illustrate the use of a full ester, i.e., a triester of a tricarboxylic acid and a mixture of various polyamine components.

1,2,4-triethylmellitate (14.7 g., 0.05 mol) and "Tonox" (17.25 g., 0.075 mol) are dissolved together in a mixture of N-methylpyrrolidone (5.0 g.) and xylene (3.0 g.). The solution is stored overnight at 97° C. to initiate a partial molecular weight build-up. The solution is then applied to coil as described in Example 1. The bond strength measured for coils so coated average 14.5 lbs. at room temperature.

"Tonox" is a commercial amine mixture which has been found especially useful in this invention by providing improved coating characteristics. "Tonox" is a Naugatuck Chemical tradename for a crosslinking agent useful in epoxy resin and polyurethane resin systems and as an antioxidant and processing aid for natural and synthetic rubbers. It may be described as a reaction product of aniline and formaldehyde consisting of approximately, on a weight basis, 70% p,p'-diaminodiphenylmethane, the rest of the composition being a mixture containing essentially the o,o'- and the mixed o,p-isomers, dianilidomethane and its half inversion product, and methylene aniline trimer. The product can be further characterized by a molecular weight of approximately 230, a pH of 9 to 10 as a 10% slurry in water, a flash point and fire point (Cleveland Open Cup) of 443 and 513° F. respectively, a melting temperature lower than 80° C. a specific gravity of 1.15 and an 80° C. viscosity of 9 Saybolt-Furol seconds.

EXAMPLE 3

It is not necessary to convert all of the trimellitic anhydride to a free acid or to an ester derivative before addition of the diamine. In this example, a portion of the diamine is permitted to react with a portion of the anhydride to form, presumably, compounds of this type.

Trimellitic anhydride (19.2 g., 0.10 mol) is stirred with N-methylpyrrolidone (46 g.) and "Tonox'" (5.75 g., 0.025 mol) is added. The heat of the reaction raises the temperature of the solution to about 45° C. When all the "Tonox" has dissolved, the mixture is warmed to 60° C. to complete the reaction between the anhydride groups and the amine groups so as to form the compounds represented by Formula VII, above. Ethyl alcohol (2.4 g. 2B anhydrous) is added to the mixture and reacted with the remaining anhydride groups to form the monoethyl ester of trimellitic acid. This mixture of monoethyl ester of trimellitic acid and those compounds represented by Formula VII is maintained at 60 to 65° C. until all solids have dissolved. The solution is then diluted with xylene (23 g.) and more "Tonox" (18.4 g., .082 mol) is added with warming to 65° C. to effect its dissolution. The resulting solution, containing about 40% solids by weight, when applied to coils of enameled magnet wire as in Example 1 and baked out, yields an envelope with bond strengths of At | Lbs.
Room temperature | 36.0
180° C. | 35.2
225° C. | 15.0

EXAMPLE 4

Varnish solutions prepared according to Examples 1 and 3 were applied to steel panels and baked to give a coating about 0.002 inch thick, having the following properties: (For comparison, the properties of a commercial silicone coating of the same thickness and on the same substrate are also given).

| Property | TMA Varnishes | Silicone Varnish |
|---|---|---|
| Sward Hardness (cycles) | 68 | 22 |
| Abrasion resistance (weight loss/1,000 rev.) (mg.) | 15.6 | 806 |
| Shear Hardness (force to penetrate) (g.) | 900 | 105 |

The superiority of the varnishes of the invention is again evident.

The above tests for hardness and abrasion resistance are standard in the trade.

EXAMPLE 5

This example is set forth to illustrate another excellent coating solution which is prepared using a free tricarboxylic acid.

Trimellitic anhydride (192 g., 1.0 mol) is charged into a jar and a mixture of N-methyl-pyrrolidone (452 g.) and water (18 g.) added in order to convert the anhydride group into the free acid groups. This mixture is stirred, with heating to 60° C., until all the trimellitic anhydride is dissolved and converted to the free acid. Stirring is continued at 60° C. for a further 30 minute period to ensure complete hydrolysis of the anhydride. "Tonox'" (242 g., 105 mol) is added, with stirring until dissolved, and the solution is diluted to 40% solids with xylene.

This product produced coatings with properties comparable to those of the Example 4 solution.

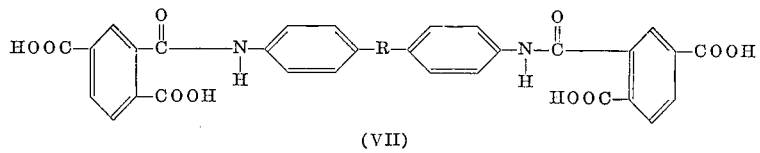

(VII)

The present of such compounds in the coating solution does not interfere with the formation of good high temperature bonding varnishes. The remaining portion of the trimellitic dianhydride is then coverted into the monoethyl ester as in Example 1.

EXAMPLE 6

Example 1 is repeated here except that "Tonox" is substituted for the methylene dianiline used in Example 1 and different properties of reactants are used. The quantities of reagents used are as follows: trimellitic anhydride, 120 g. (0.625 mol); ethyl alcohol, 17.25 g. (0.375 mol); "Tonox'" 115 g. (0.5 mol); N-methyl pyrrolidone, 352 g. and xylene, 26 g. The ethyl alcohol is reacted with the trimellitic anhydride in order to form the mixed monoethyl esters of trimellitic acid. The solution is prepared and wire is coated according to the procedures of Example 1.

The bond strengths of coils coated with the material are found to be 33.7 lbs. at room temperature and 11.2 lbs. at 180° C.

EXAMPLE 7

Example 1 is repeated here except that "Tonox" is substituted for the methylene dianiline used in Example 1 and different proportions of reactants are used. The quantities of reagents used are as follows: Trimellitic anhydride, 96 g. (0.5 mol); ethyl alcohol 12 g. (0.261 mol); Tonox, 230 g. (1.0 mol); N-methyl pyrrolidone, 338 g., and xylene, 169 g.

The ethyl alcohol is reacted with the trimellitic anhydride in order to form the monoethyl ester of trimellitic acid. The solution is prepared and wire is coated according to the procedures of Example 1.

Bond strengths for coils coated with this material are found to be 29 lbs. at room temperature, 20.7 lbs. at 180° C. and 11.5 lbs. at 225° C.

EXAMPLE 8

In this example, the procedure of Example 1 is again followed. However, polymethylene polyaniline is substituted for the methylene dianiline used in Example 1. The polymethylene polyaniline is a condensation product of formaldehyde with aniline which corresponds to the general Formula VI wherein $m$ is 2. The quantities of reagents are as follows: trimellitic anhydride, 96 g. (0.5 mol); ethyl alcohol, 23 g. (0.5 mol)); polymethylene polyaniline, 115 g. (about 0.5 mol); N-methyl pyrrolidone, 234 g., and xylene, 117 g. The ethyl alcohol is reacted with the trimellitic anhydride in order to form the monoethyl ester of trimellitic acid. The solution is prepared and wire is coated according to the procedures of Example 1.

The bond strengths of coils coated with this varnish are found to be 50 lbs. at room temperature, 31 lbs. at 180° C. and 21 lbs. at 225° C.

The bond strength values for the foregoing examples are tabulated in the following Table I.

TABLE I.—SUMMARY OF BOND STRENGTHS GIVEN IN WORKING EXAMPLES [1]

| Example | Room Temperature [2] | 180° C. | 225° C. |
| --- | --- | --- | --- |
| 1 (Silicone Control) | 30 | 1 | 0 |
| 1 | 41.2 | 29.5 | 10.2 |
| 2 | 14.5 | | |
| 3 | 36.0 | 35.2 | 15.0 |
| 6 | 33.7 | 11.2 | |
| 7 | 29.0 | 20.7 | 11.5 |
| 8 | 50 | 31 | 21 |

[1] Values given in pounds.
[2] Room Temperature is 23° C.±3° C.

The following Examples 9 to 15 are set forth to illustrate the various tricarboxylic components and polyamine components which may be used in the practice of the present invention. In each example the coating compositions are prepared, coated on wire coils and tested according to the general procedures set forth above. Good bond strengths are obtained with the coated wire coils. The particular reactants used are summarized in the following Table.

TABLE II.—SUMMARY OF REACTANTS USED IN EXAMPLES 9 TO 15

| Ex. | Tricarboxylic Component | Polyamine Component | Mole Ratio |
| --- | --- | --- | --- |
| 9 | TMA-monoethylene glycol ester | 4,4'-oxydianiline | 1/1 |
| 10 | TMA-monobutyl ester | p-Phenylene diamine | 1/1.1 |
| 11 | BTCA-diethyl ester | do | 1.1/1 |
| 12 | BTCA-monoethyl ester | 4,4'-methylene dianiline | 1/1 |
| 13 | BTCA-(free acid) | do | 1/1 |
| 14 | TMA-(free acid) | 4,4'-oxydianiline | 1/1 |
| 15 | TMA-mono[2-(dimethylamino)ethyl] ester. | 4,4-methylene dianiline | 1/1 |

LEGEND
TMA—trimellitic acid
BTCA—benzophenone 4,3',4'-tricarboxylic acid.

EXAMPLE 16

This example is set forth to illustrate the use of the monomeric type compositions of the present invention as molding powders.

Trimellitic anhydride (192 g., 1.0 mol) is charged into a jar and a mixture of acetone (390 g.) and water (18 g.) is added in order to convert the anhydride group into the free acid groups. This mixture is stirred, with heating to 60° C., until all the trimellitic anhydride is dissolved and converted to the free acid. Stirring is continued at 60° C. for a further 30 minute period to ensure complete hydrolysis of the anhydride.

An equimolar amount of 4,4'-methylene dianiline and 200 grams of acetone is then charged to the jar with stirring until solution is complete. The reactants are then evaporated to dryness using a Rinco evaporator under partial vacuum and a temperature of about 55° C. The resulting intimate dispersion of reactants is then heated at 105° C. for four hours, at 125° C. for 3 hours and then ground to a fine powder, and then pressed in a mold for one hour at 12,500 p.s.i. and 500° F. to give a disc having a diameter of 2¼ inches and a height of ¼ inch. The disc is found to have good thermal stability and insulative properties.

The solutions of the present invention can be used, as shown by the examples, as electrical equipment varnishes and protective surface coatings. Their nature and properties however will recommend them to those skilled in the art for many other related applications. For instance, they may be employed in the impregnation of glass fabrics in the formation of laminates, as structural adhesives, in the formation of free films, fibers and molded products. They may be used alone or in multiple coating applications in conjunction with other natural and synthetic resins such as phenol-aldehyde condensates, silicones and so on. In general, it is evident that their excellent combination of properties such as ease of application, stability on storage, available range of concentrations as well as the remarkable heat resistance and great adhesion of the cured products which they yield, will suggest many other uses which are unnecessary to mention here.

It is not inconsistent with this invention to incorporate in the monomeric solutions small amounts of other polyfunctional compounds which lead to greater crosslinking of the ultimate polymer chains, provided that they do not react with the solution components before curing.

The particular reactants used to prepare a given coating solution will depend of course, on the combination of properties that the terminal polymeric product must possess. To be considered in this respect are resistance to heat, adhesion to substrate coated—be it class 220° C. enamel wire, glass cloth, cold rolled steel or something else, flexibility, abrasion resistance, dielectric characteristics and so on. The preferred compositions, however, are described in the examples.

The coatings of the present invention can be cured to infusible and insoluble resins at any temperature within the range of 125° C. to 500° C. The actual temperature selected depends on the heat resistance of the substrate coated, the time of cure desired, the cost factor in operating high temperature ovens, the type of equipment employed and the particular monomers employed. In general, the range of 150° to 225° C. will be most economical for the majority of possible applications.

This invention also contemplates the use of fillers, pigments, fibrous and particulate reinforcing elements, dyes, extenders, etc. in the coating compositions of the present invention.

From the foregoing it should be apparent that many deviations and modifications can be made in the practice of the present invention without departing from the spirit and scope thereof.

What is claimed is:

1. A composition of matter comprising at least 3% by weight of polymer-forming components consisting of (1) an aromatic polyamino compound containing at least 6 carbon atoms and (2) an aromatic tricarboxylic compound selected from the class of compounds having the formula

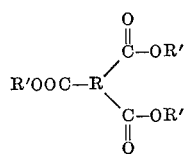

wherein R is a trivalent aromatic radical containing from 6 to about 15 carbon atoms and wherein R' is selected from the group consisting of hydrogen, alkyl radicals of from 1 to 8 carbon atoms, oxyalkyl radicals of from 2 to 8 carbon atoms, hydroxyl alkyl and hydroxy(oxy)alkyl radicals wherein the alkyl radical contains from 2 to 12 carbon atoms; aryl radicals of from 6 to 10 carbon atoms; and N,N dialkyl alkyl radicals of the following general formula:

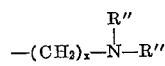

wherein R'' is an alkyl radical of from 1 to 5 carbon atoms and $x$ is an integer of from 2 to 6, said polymer-forming components being present in a molar proportion selected from the range of about 25% excess of the tricarboxylic compound to about 100% excess of the polyamino compound.

2. The composition of claim 1 wherein R' is hydrogen.

3. The composition of claim 1 wherein R' is a lower alkyl radical of from 1 to 4 carbon atoms.

4. The composition of claim 1 wherein at least one R' is a lower alkyl radical of from 1 to 4 carbon atoms.

5. The composition of claim 1 wherein the carboxylic compound is selected from the group consisting of trimellitic acid, benzophenone tricarboxylic acid and partial and full ester derivatives of these acids.

6. The composition of claim 1 wherein R is selected from the group consisting of trivalent radicals of benzene, naphthalene, biphenyl, diphenyl ether, diphenyl sulfide, diphenyl sulfone, diphenyl amine, benzophenone and ditolyl ether and wherein the aromatic polyamino compound is selected from the group consisting of phenylene diamine, diaminobiphenyl, diaminodiphenyl ether, diaminodiphenyl sulfide, diaminodiphenyl sulfone, diaminoditolyl ether, diaminodiphenyl methane, diaminodiphenyl propane, thioaniline diphenyl ether, 1,2,4-triaminobenzene, polymethylene polyaniline and diaminotriphenyl amine.

7. A composition of matter comprising 10 to 60% by weight of polymer-forming components comprising (1) methylene dianiline and (2) a tricarboxylic compound selected from the group consisting of trimellitic acid and its monoalkyl esters with alcohols having 1 to about 8 carbon atoms; said components being present in a molar proportion ranging from chemical equivalence to a 50% excess of the methylene diamine.

8. A coating composition of polymer-forming components comprising (A) an amine component selected from the group consisting of amine components corresponding to the following general formulae (1) 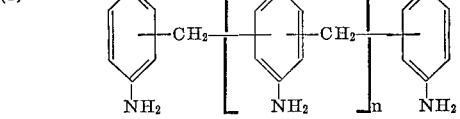

wherein $n$ is an integer of from 0 to 3; and

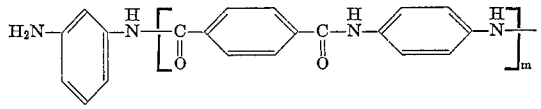

wherein $m$ is an integer of from 1 to 4;

(B) a compound selected from the group consisting of trimellitic acid and its monoalkyl esters; wherein the alkyl group contains from 1 to 8 carbon atoms, wherein the amine component is present in amounts up to a 50% molar excess.

9. A process for preparing a heat resistant coating which comprises (A) coating a substrate with a composition of matter comprising at least 3% by weight of polymer-forming components consisting of (1) an aromatic polyamino compound containing at least 6 carbon atoms and (2) an aromatic tricarboxylic compound selected from the class of compounds having the formula

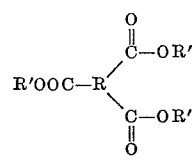

wherein R is a trivalent aromatic radical containing from 6 to about 15 carbon atoms and wherein R' is selected from the group consisting of hydrogen, alkyl radicals of from 1 to 8 carbon atoms, oxyalkyls of from 2 to 8 carbon atoms, hydroxyl alkyl and hydroxy(oxy)alkyl radicals wherein the alkyl radical contains from 2 to 12 carbon atoms; aryl radicals of from 6 to 10 carbon atoms; and N,N-dialkyl alkyl radicals of the following general formula:

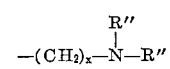

wherein R'' is an alkyl radical of from 1 to 5 carbon atoms and $x$ is an integer of from 2 to 6, said polymer-forming components being present in a molar proportion selected from the range of about 25% excess of the tricarboxylic compound to about 100% excess of the polyamino compound;

(B) drying the coated substrate;

(C) baking the residual film at a temperature selected from the range of 125 to 500° C. to form a cured resin; and (D) repeating the preceding operations until the desired thickness of cured resin is obtained.

10. A composition of matter suitable for use as a molding powder, fluid bed coating and other related uses which comprises an intimate mixture of (1) an aromatic polyamino compound containing at least 6 carbon atoms and (2) an aromatic tricarboxylic compound selected from the class of compounds having the formula

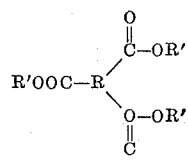

wherein R is a trivalent aromatic radical containing from 6 to about 15 carbon atoms, and wherein R' is selected from the group consisting of hydrogen, alkyl radicals of from 1 to 8 carbon atoms, oxyalkyl radicals of from 2 to 8 carbon atoms, hydroxyl alkyl and hydroxy(oxy)alkyl radicals wherein the alkyl radical contains from 2 to 12 carbon atoms; aryl radicals of from 6 to 10 carbon atoms; and N,N-dialkyl alkyl radicals of the following general formula:

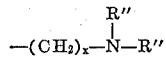

wherein R'' is an alkyl radical of from 1 to 5 carbon atoms and $x$ is an integer of from 2 to 6; said polymer-forming components being present in a molar proportion selected from the range of about 25% excess of the tricarboxylic compound to about 100% excess of the polyamino compound.

11. The composition of claim 10 wherein the carboxylic compound is selected from the group consisting of trimellitic acid, benzophenone tricarboxylic acid and partial and full ester derivatives of these acids.

12. The composition of claim 10 wherein R is selected from the group consisting of trivalent radicals of benzene, naphthalene, biphenyl, diphenyl ether, diphenyl sulfide, diphenyl sulfone, diphenyl amine, benzophenone and ditolyl ether and wherein the aromatic polyamino compound is selected from the group consisting of phenylene diamine, diaminobiphenyl, diaminodiphenyl ether, diaminodiphenyl sulfide, diaminodiphenyl sulfone, diaminoditolyl ether, diaminodiphenyl methane, diaminodiphenyl propane, thioaniline diphenyl ether, 1,2,4-triaminobenzene, polymethylene polyaniline and diaminotriphenyl amine.

References Cited

UNITED STATES PATENTS

| | | |
|---|---|---|
| 2,984,590 | 5/1961 | Anderson. |
| 2,994,623 | 8/1961 | Saxon. |
| 3,179,634 | 4/1965 | Edwards. |
| 3,179,635 | 4/1965 | Frost et al. |
| 3,260,691 | 7/1966 | Lavin et al. |

FOREIGN PATENTS

| | | |
|---|---|---|
| 570,858 | 7/1945 | Great Britain. |

WILLIAM H. SHORT, Primary Examiner

L. L. LEE, Assistant Examiner

U.S. Cl. X.R.

117—132, 161; 260—65, 78